(12) United States Patent
Basile et al.

(10) Patent No.: US 6,510,783 B1
(45) Date of Patent: Jan. 28, 2003

(54) MACHINE TO PRODUCE ESPRESSO COFFEE

(75) Inventors: Salvatore Basile, Padua (IT); Silvano Pozzobon, Trevignano (IT)

(73) Assignee: Simac-Vetrella SpA, Gorgo al Monticano (IT)

(*) Notice: Subject to any disclaimer, the term of this patent is extended or adjusted under 35 U.S.C. 154(b) by 0 days.

(21) Appl. No.: 09/914,039

(22) PCT Filed: Feb. 16, 2000

(86) PCT No.: PCT/IB00/00166

§ 371 (c)(1),
(2), (4) Date: Aug. 22, 2001

(87) PCT Pub. No.: WO00/49926

PCT Pub. Date: Aug. 31, 2000

(30) Foreign Application Priority Data

Feb. 22, 1999 (IT) .......................................... UD99A0038

(51) Int. Cl.[7] ................................................. A47J 31/40
(52) U.S. Cl. ..................... 99/289 R; 99/295; 99/302 R; 99/281; 99/302 P
(58) Field of Search ........................... 99/289 R, 289 T, 99/289 P, 295, 280, 281, 282, 283, 302 R, 302 P

(56) References Cited

FOREIGN PATENT DOCUMENTS

| DE | 19647039 | * | 7/1997 |
|----|----------|---|--------|
| EP | 0334571  | * | 9/1989 |
| EP | 0784955  | * | 7/1997 |

OTHER PUBLICATIONS

WO 95/17121; Jun. 1995; France.*

* cited by examiner

Primary Examiner—Reginald L. Alexander
(74) Attorney, Agent, or Firm—Antonelli, Terry, Stout & Kraus, LLP

(57) ABSTRACT

Machine to produce espresso coffee comprising a containing structure defining an infusion chamber co-operating with element (14) to deliver water and element (15) to instantaneously heat the water, the infusion chamber comprising two parts able to be coupled so as to define an open condition of the infusion chamber and a closed condition during the coffee-preparation cycle, the upper part (20a) of the infusion chamber (20) being made on a block (22) movable from a first raised position to a second lowered position, the lower part (20b) being made on a trolley (23) movable from a first inner position, wherein the lower part (20b) is arranged below the upper part (20a), to a second outer position wherein the lower part (20b) is removed outside the structure of the machine (10), the machine comprising expulsion element (36) able to automatically remove the portion (11), after the coffee has been delivered, during the withdrawal movement of the lower part (20b) from the structure (35).

23 Claims, 6 Drawing Sheets

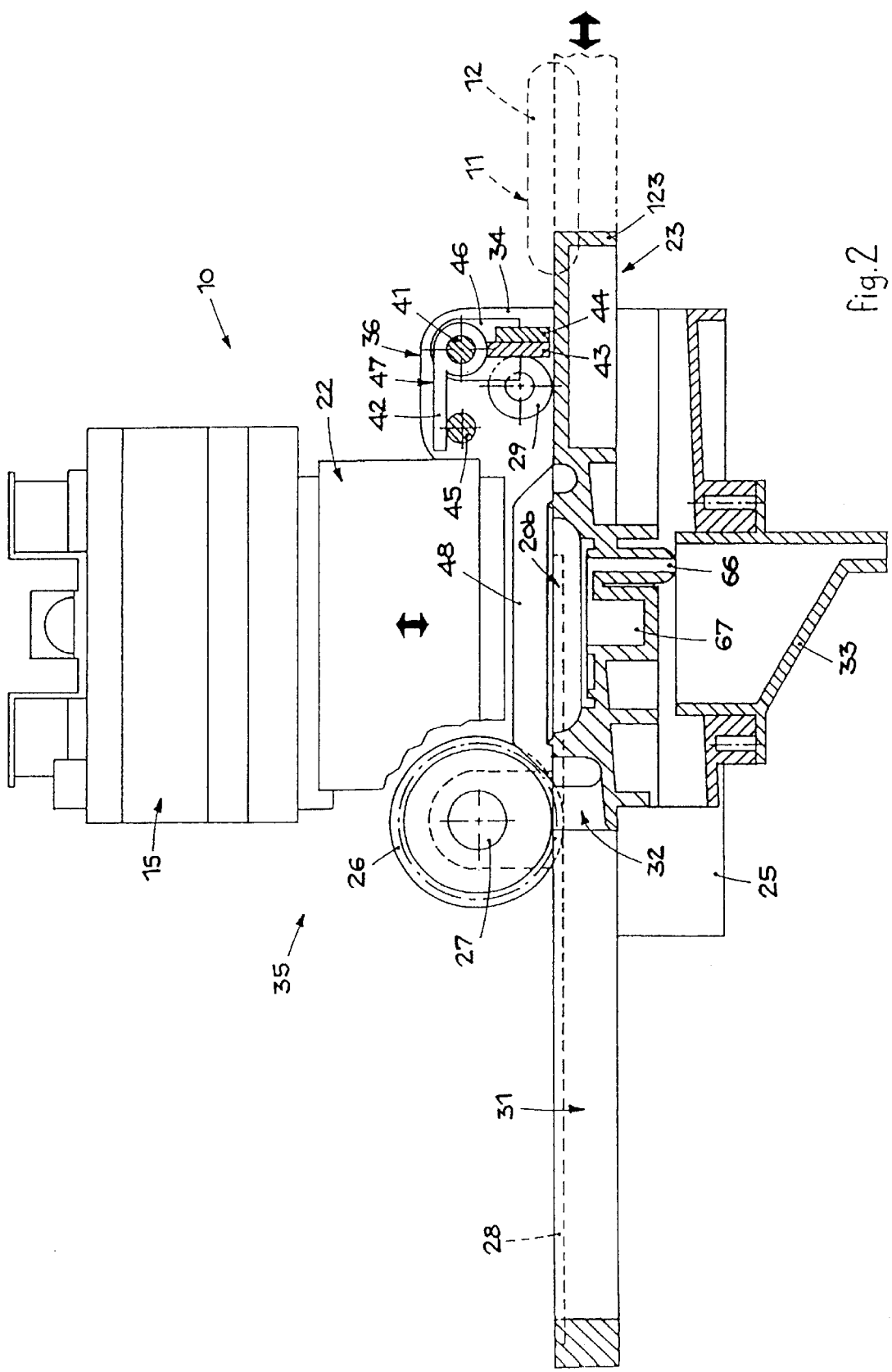

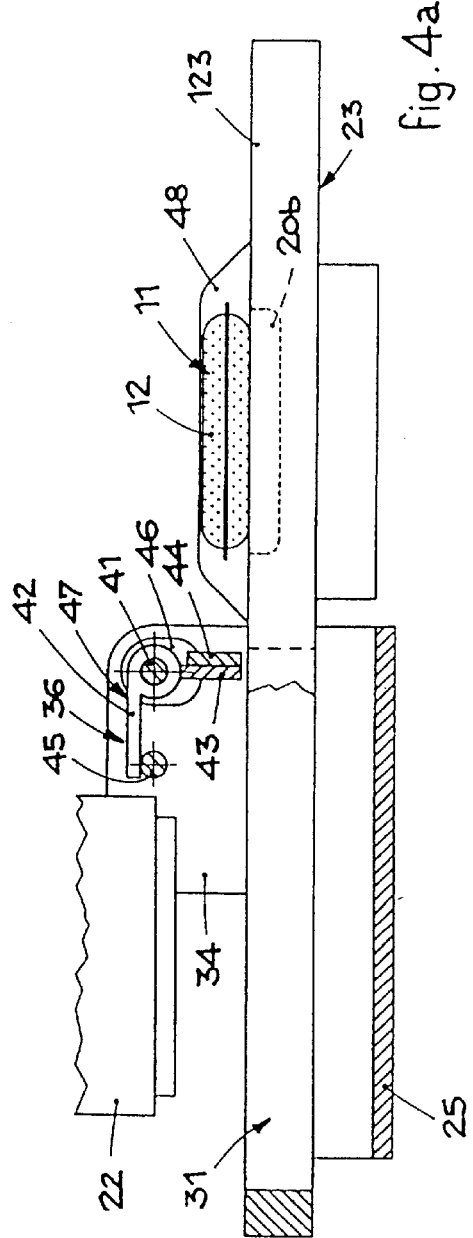
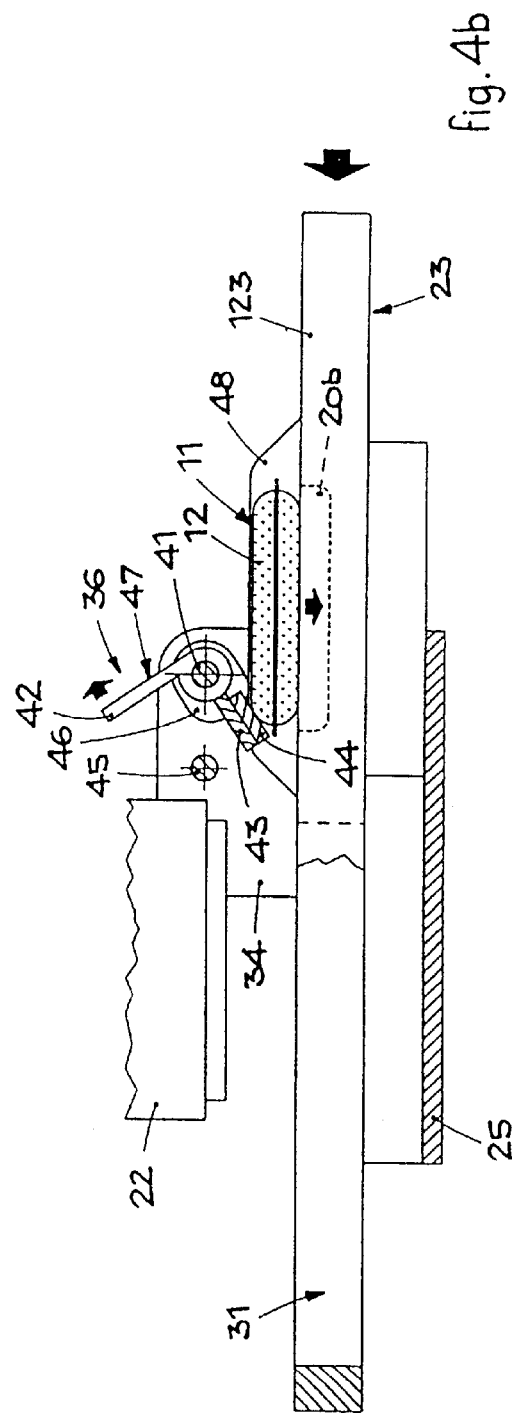

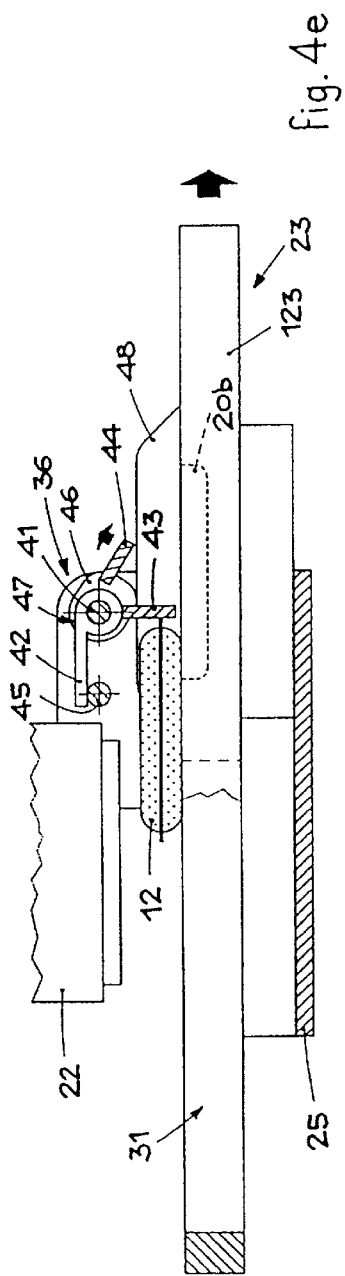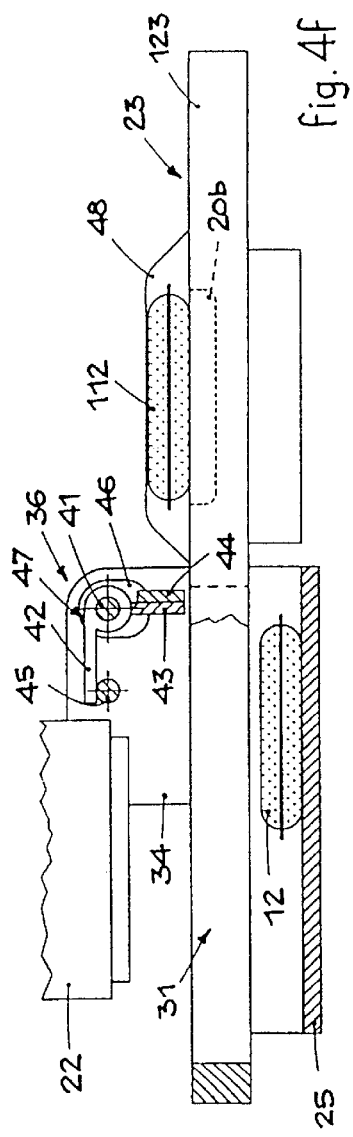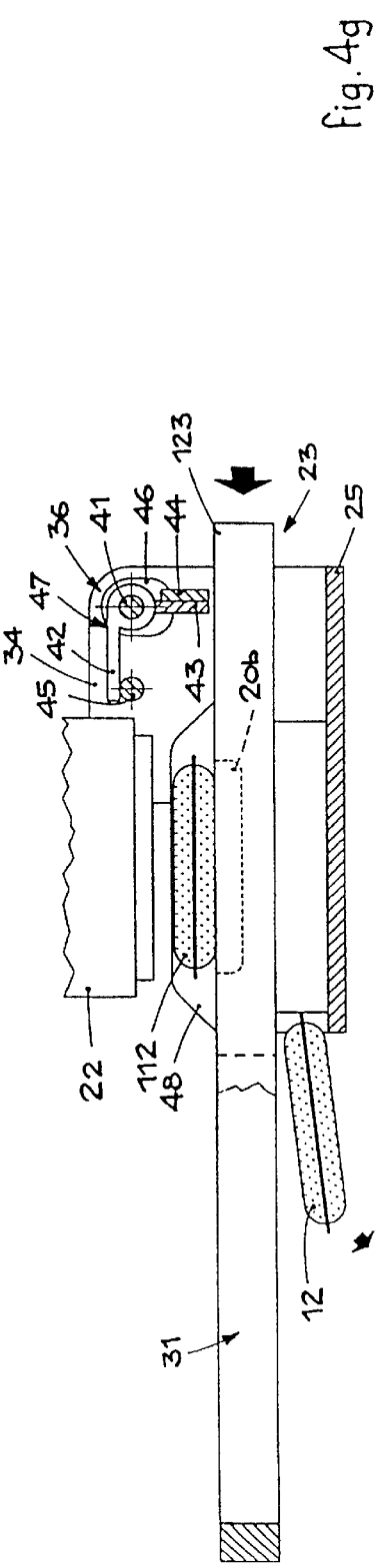

MACHINE TO PRODUCE ESPRESSO COFFEE

FIELD OF THE INVENTION

This invention concerns a machine to produce espresso coffee as defined in the main claim.

To be more exact, the invention concerns a machine of the type able to produce espresso coffee by using pre-packed portions based on coffee powder.

BACKGROUND OF THE INVENTION

The state of the art includes machines to produce espresso coffee, generally for use in the home, which use pre-packed portions of coffee powder.

The pre-packed portions are used once and normally consist of pressed wafers wrapped one by one in paper wrappers, or of plastic capsules containing the coffee powder.

Conventional machines to produce espresso coffee generally comprise a water tank associated with a delivery circuit co-operating with pump means and with instantaneous heating means.

The delivery circuit is associated at the ends with an infusion chamber in which there is a seating able to contain at least one of the said pre-packed portions.

The infusion chamber is defined by two reciprocally movable sides able to assume a first open position, wherein they allow the pre-packed portion to be introduced and removed before and after the coffee-preparation cycle, and a second closed position wherein they enclose the pre-packed portion during the preparation of the coffee.

The infusion chamber is also associated at the lower part with a delivery channel by means of which the coffee produced flows into the container used to drink it (cup, glass, etc.).

To prepare the espresso, the user inserts a pre-packed portion inside the infusion chamber and arranges the two parts of the latter in the closed position; then, by acting on the appropriate commands, he/she begins the preparation of the espresso.

During this step, the pump means take the necessary quantity of water from the tank and send it to the delivery circuit, where it is taken to the correct temperature by the instantaneous heating means.

The hot water is then sent under pressure inside the infusion chamber where it passes through the pre-packed portion, emerging from the delivery channel in the form of espresso coffee.

When the coffee has been delivered, the infusion chamber is opened to allow the used pre-packed portion to be removed so as to prepare the machine for a new coffee-preparation cycle.

In conventional machines the main functional disadvantages are, firstly, to correctly perform the operation to insert and remove the pre-packed portions into/from the infusion chamber and secondly, that the opening and closing of the latter is not very practical.

The pre-packed portions, in fact, have to be introduced into the infusion chamber in a completely manual manner, without the aid of guide and centering means, and therefore they may be positioned incorrectly or inaccurately, thus compromising the subsequent closing of the infusion chamber.

The correct positioning of the portions is also made problematical by the location of the infusion chamber, which is often made in very restricted spaces and is difficult to access.

It is also difficult to remove the used pre-packed portion, both because it tends to remain attached to one of the parts of the infusion chamber, and also because at the end of the operation to prepare the coffee it is still very hot and can burn the hands of whoever tries to remove it.

In some machines, the lower part of the infusion chamber is associated with a removable support; although this embodiment makes it easier to insert and remove the pre-packed portion, it entails the difficulty that the support itself is difficult to remove and re-assemble.

When the support is re-assembled, moreover, there is the risk that the pre-packed portion may be displaced which can therefore be incorrectly arranged and centered when the infusion chamber is closed.

The infusion chamber too is usually opened/closed manually and this may also entail, if performed incorrectly, an incorrect functioning of the machine.

Document EP-A-784.955 describes an espresso coffee machine comprising a box-like container inside which is housed a supporting plate able to rotate, during use, around a vertical axis.

The rotary plate is suitable to define a plurality of seatings for individual portions of coffee; as it rotates, it causes the sequential positioning of the portions of coffee respectively in a loading station, a working station where the portion is hit by a flow of hot water to obtain the coffee, and a station to discharge the used portion.

This solution is characterised by the fact that it is very bulky because it has three angularly different positions wherein the three operating steps take place.

It is rather complicated for the user to insert the new portion of coffee into the loading seating, which must be done in narrow, limited spaces, by opening and closing a sliding door.

Moreover, the mechanism which advances the rotary plate is complex, and easily subject to breakage and wear.

The fact that several portions of coffee are kept inside the machine after use may cause humidity and bad smells.

The mechanism to expel the used portions is also rather complicated.

Moreover, the machine does not provide to generate steam only.

Document DE-A-196 47 039 shows a machine to produce coffee comprising a boiler head movable upwards to facilitate the operations to load the portion of coffee and a little cup which can be moved on a horizontal plane after the boiler head has been raised.

This solution in no way solves the problem of discharging the used coffee portion, nor does it make it easy to carry out the operations to position and center the individual portions on the relative seating in the cup.

Moreover, it does not provide automatic means, co-ordinated with the start of the cycle to produce the coffee, to ensure that the two parts of the infusion chamber, upper and lower, are hermetically sealed.

Furthermore, this machine does not provide the possibility to generate steam only.

EP-A-334.571 and EP-A-041.931 discloses coffee machines having means to remove the used coffee portion; however, they do not disclose or suggest means able to automatically remove said used portion, after the delivery of the coffee, during the withdrawal movement of the lower part of the machine from an inner working position to an outer loading position, consistently and inherently with this movement, to clear out the positioning seating and allow at once to an user the loading of a new portion in this seating.

The present Applicant has devised and embodied this invention to overcome these shortcomings, and to obtain further advantages.

SUMMARY OF THE INVENTION

The invention is set forth and characterised in the main claim, while the dependent claims describe other characteristics of the main embodiment.

The purpose of the invention is to provide a machine to produce espresso coffee, of the type able to use pre-packed portions of coffee powder, which will be economical and easy to use, which will facilitate the operations to position and remove the pre-packed portions and wherein the opening and closing of the infusion chamber will be achieved automatically.

Another purpose of the invention is to achieve a machine to produce espresso coffee with a structure which can easily be reconfigured to use pre-packed portions of different types and packaging.

A further purpose is to achieve a machine wherein the infusion chamber is hermetically sealed automatically in a manner coordinated with the performance of the cycle to produce the coffee.

Another purpose of the invention is to ensure that the portion is automatically discharged after every cycle to prepare the coffee, and also to ensure that the portion is always accurately positioned and centered in the relative seating, inside the infusion chamber.

The machine according to the invention comprises an infusion chamber enclosed inside a containing structure and defined by two parts, respectively upper and lower, which can be selectively coupled together during the operating steps of the cycle to prepare the coffee.

Both these parts, upper and lower, are able to be associated with filter means.

According to the invention, the lower part is made on a trolley movable on a substantially horizontal plane from a first, inner position, in which it is arranged in co-operation and below the upper part, to a second, outer position, in which the lower part is removed from the upper part and emerges from the structure of the machine to facilitate the operations to load the new portion of coffee.

In a preferential embodiment, the trolley has motorised drive means. According to a variant, it is moved manually.

The upper part is made on a block movable in a vertical direction able to assume a first, raised position, during the insertion/removal steps, and a second, lowered position to close the infusion chamber during the step to prepare and deliver the coffee.

According to one characteristic of the invention, the machine to produce espresso coffee can be alternatively configured with an infusion chamber for pre-packed portions of the wafer type, or with an infusion chamber for portions of the capsule type.

According to the invention, the pre-packed portions are inserted into the infusion chamber by removing the trolley from inside the structure of the machine, in order to deposit the pre-packed portion on the lower part, and then by returning the trolley to its inner position in order to arrange the lower part in co-operation with and below the mating upper part.

It is extremely easy to deposit the pre-packed portion because the lower part is completely accessible when the trolley is in its outer position; and, once it has been returned to the inner position, it automatically causes the correct positioning and centering of the pre-packed portion inside the infusion chamber.

According to another characteristic of the invention, the machine comprises expulsion means able to automatically remove the used pre-packed portion from the lower part during the movement of the trolley as it exits from inside to outside the machine.

Thanks to the expulsion means, therefore, it is possible to avoid the manual removal of the hot used pre-packed portion, and to facilitate the insertion of a new pre-packed portion into the infusion chamber, since the lower part is already free and ready to accommodate the new portion.

According to one embodiment of the invention, the movement of the trolley to the inner position, to insert a new pre-packed portion inside the infusion chamber, causes the used pre-packed portion to be automatically discharged from the coffee machine and unloaded into collection means provided for this purpose.

According to another characteristic of the invention, the vertical movement of the block defining the opening/closing of the infusion chamber is automated and occurs in co-ordination with the execution of the cycle to prepare the coffee.

According to a preferential embodiment, the block is moved by exploiting the hydraulic thrust generated by the forced circulation of water inside an appropriate delivery circuit connected to the main circuit which delivers the water from which the coffee is made.

BRIEF DESCRIPTION OF THE DRAWINGS

These and other characteristics of the invention will become clear from the following description of a preferential form of embodiment, given as a non-restrictive example, with reference to the attached drawings wherein:

FIG. 2 shows the coffee machine of FIG. 1 in a partly sectioned side view;

FIGS. 4a–4g show schematically the steps to insert and remove the pre-packed portions of the wafer-type into/from the infusion chamber of the machine according to the invention.

DETAILED DESCRIPTION OF A PREFERRED FORM OF EMBODIMENT

Figure 1:
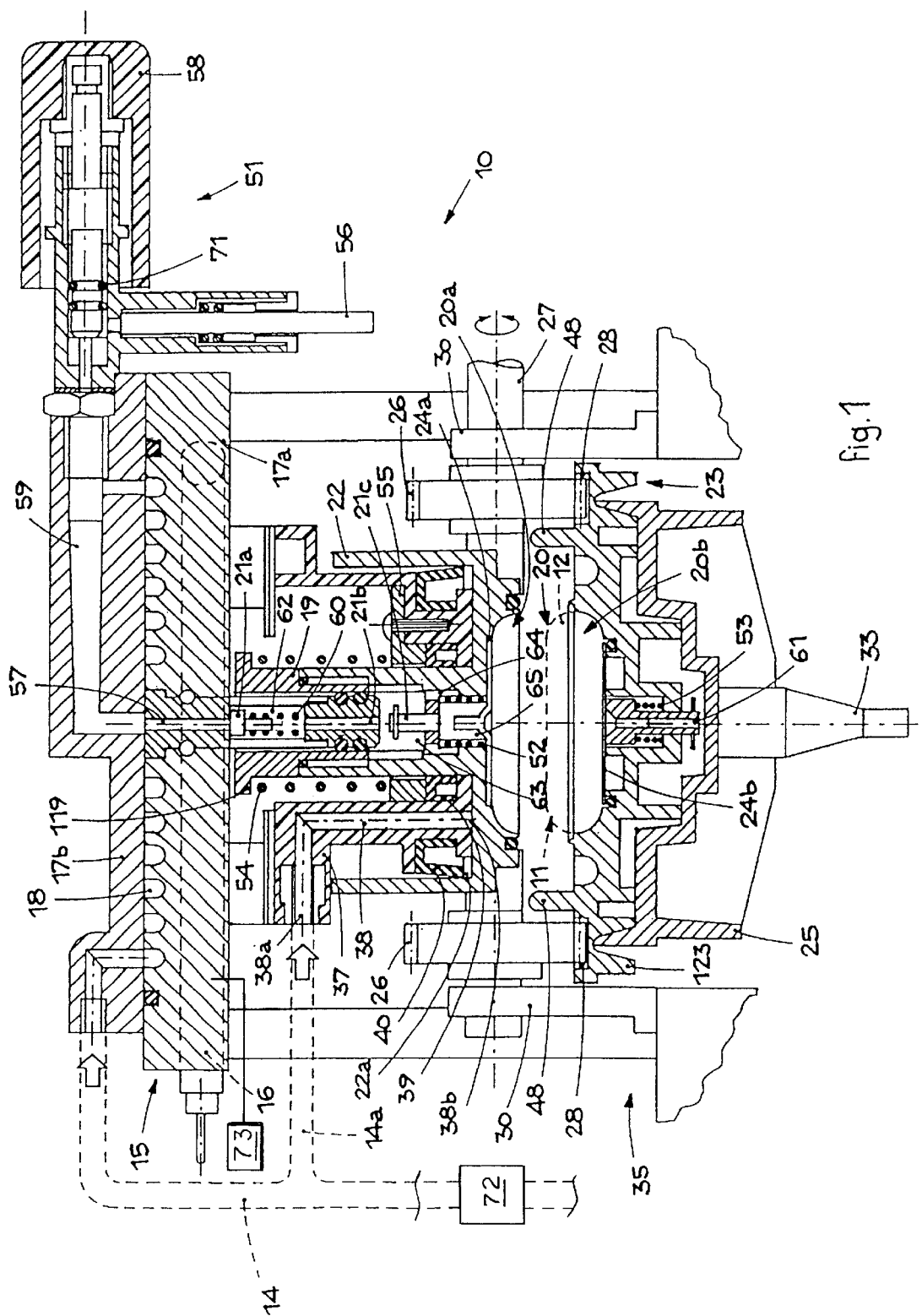
FIG. 1 is a front section of a machine to produce espresso coffee according to the invention.

The machine to produce espresso coffee according to the invention, shown only partly in FIGS. 1 and 2 and indicated in its entirety by the reference number 10, uses pre-packed portions 11 of coffee powder which are infused in hot water.

Figure 3A:
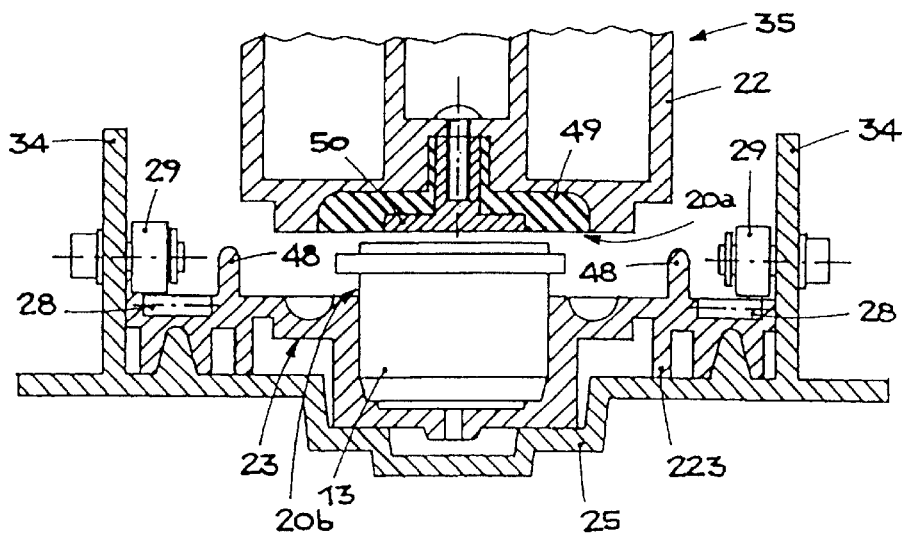
FIG. 3a is a part view of a variant of FIG. 1.
Figures 3B, 3C:
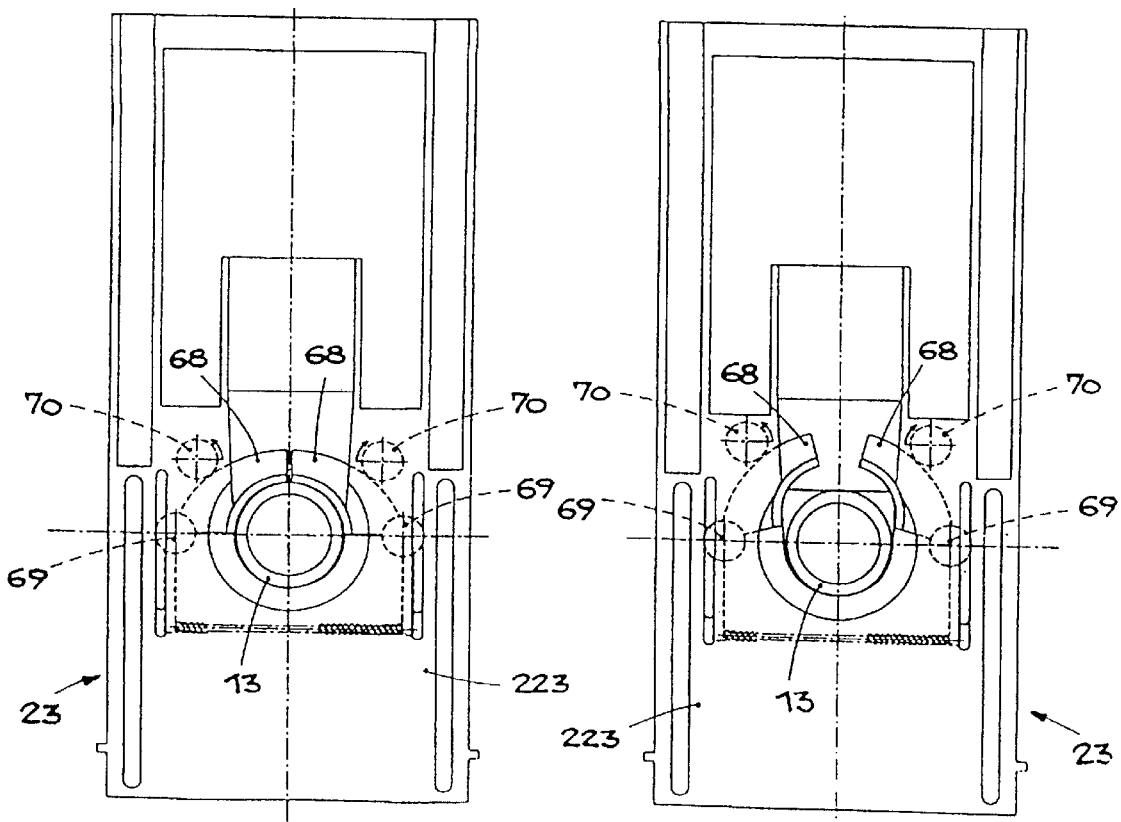
FIGS. 3b and 3c show schematically and from above a system to retain a capsule-type portion.
Figure 4C:
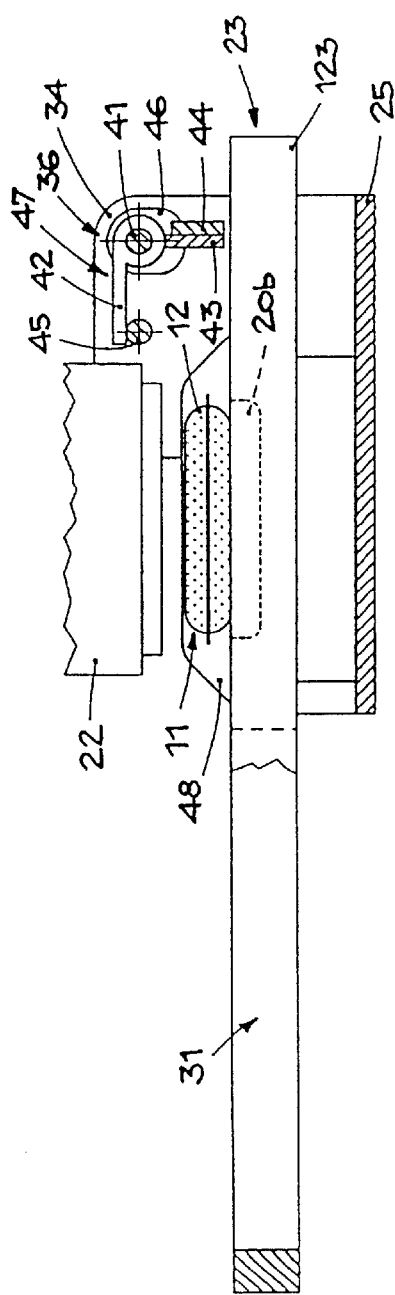
Figure 4D:
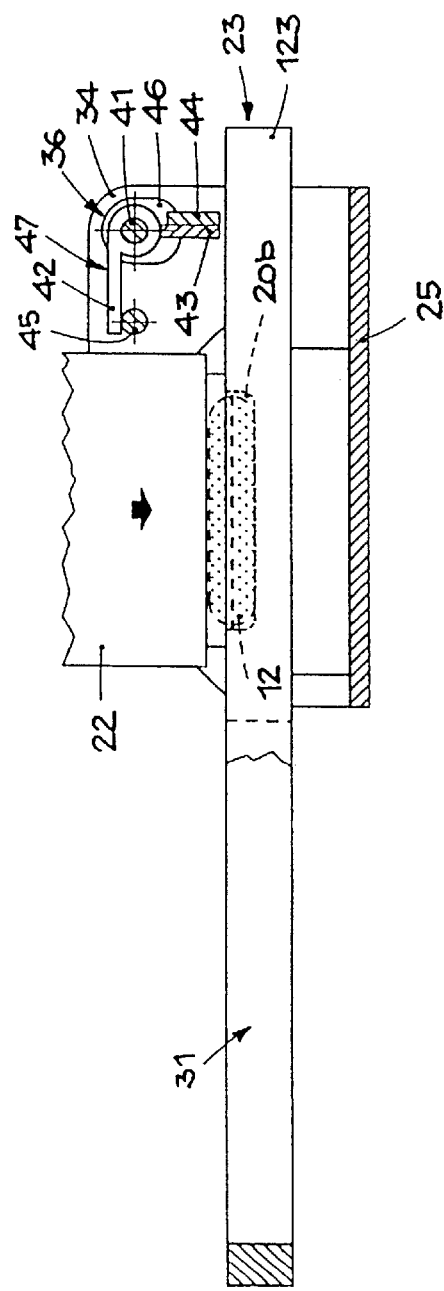

The pre-packed portions 11 may consist either of a wafer 12 of pressed coffee powder wrapped in paper (FIGS. 1, 2, 4a–4g), or of plastic capsules 13 containing the coffee powder (FIGS. 3a, 3b and 3c).

The machine 10 comprises a containing structure 35 associated in a conventional manner to a water container tank (not shown) connected to a delivery circuit 14.

In this case, the water tank is outside the structure 35, but it is within the field and scope of the invention to provide a tank inside said structure 35.

The tank is also associated with a pump 72 by means of Which the water contained therein is made to circulate under pressure inside the delivery circuit 14 and then sent to an instantaneous heating device 15 arranged in the upper part of the machine 10.

In this case, the instantaneous heating device 15 comprises a pair of plates, lower 17a and upper 17b, between which there is a coil 18 through which the water passes, cooperating with an electric resistance 16.

The coil 18 is connected on one side to a steam production assembly 51, with a delivery nozzle 56, and on the other side to a channel 57 made axially in the lower plate 17a.

The channel 57 is able to be selectively put into communication with the infusion chamber 20 by opening valve means 21a equipped with an opening/closing spring 60 and made in a hollow bushing 19 according to the method as described hereafter.

The steam production assembly 51 has a knob 58, associated with a contrasting spring 71, which can be used by the worker to selectively deliver steam through the nozzle 56.

To select the delivery of steam or hot water to prepare the coffee, the worker acts on an appropriate selector which is not shown here, and regulates the functioning of a thermostat 73 able to condition the activation of the instantaneous heating device 15.

The thermostat 73 may be selectively regulated to take the temperature of the water to around 90° C., when coffee is to be produced, or to a higher temperature, for example around 120° C., then steam is to be obtained.

When steam is produced, it fills the chamber 59 and can be delivered selectively by the user through the nozzle 56, which is made to communicate with the chamber 59 by compression of the spring 71.

According to a variant, when steam is produced the delivery pump 72 is associated with an electronic card which causes water to be sent in jets to be transformed into steam through the delivery circuit 14; this allows to restore the quantity of steam delivered circuit 14; this allows to restore the quantity of steam delivered through the nozzle 56, so as to always have a sufficient quantity of steam available for use.

When coffee is prepared, the water is heated to a temperature of around 90° C. and made to arrive in the channel 57 and from here to the infusion chamber 20, as will be seen hereafter.

The infusion chamber 20, inside which the pre-packed portions 11 are able to be accommodated and sealed during the coffee-preparation step, is defined by two parts, upper 20a and lower 20b, arranged coaxial below the bushing 19.

These parts 20a, 20b are substantially concave in shape and are substantially specularly opposite each other; they can be selectively coupled together to define at least an open condition and a closed, hermetically sealed condition of the infusion chamber 20.

The upper part 20a is made on the lower part of a vertically movable block 22 solid with the bushing 19.

The vertical movement of the block 22 is elastically contrasted by spring means 54 which act between a shoulder 119 above the bushing 19 and the surface of a stationary block 55, solidly associated with a positioning block 37 which is also stationary.

The block 22 is thus able to assume at least a raised position, wherein the upper part 20a is distanced from the lower part 20b to define the open condition of the infusion chamber 20, and a lowered position wherein the upper part 20a couples in a substantially air-tight manner with the lower part 20b to define the closed condition of the infusion chamber 20.

The positioning block 37 is equipped with a channel 38 with an inlet 38a connected to a branch 14a of the delivery circuit 14 and an outlet 38b facing towards an inner surface 22a of the block 22.

The positioning block 37 also supports ring seals 39, 40 co-operating with the inner walls of the block 22.

According to the invention, the vertical movement of the block 22 to hermetically seal the infusion chamber 20 is automated and occurs in co-ordination with the execution of the coffee-preparation cycle, exploiting the pressure of the water circulating in the delivery circuit 14.

When the delivery circuit 14 is fed by the pump means, in fact, the pressurised water is also introduced into the channel 38 through the branch 14a and emerges from the outlet 38b of the channel 38.

The presence of the ring seals 39 and 40 prevents the water from ascending upwards, and therefore the pressure of the water exerts a downwards thrust on the block 22, which is displaced with the bushing 19, causing them to move towards the lowered position and compressing the spring 54.

At the same time, the water fed through the coil 18 and heated instantaneously by the resistance 16, flows into the axial channel 57 and when it reaches a pressure sufficient to overcome the resistance at which the spring 60 is set, it opens the valve 21a, filling the compartment 62.

From here, the water flows into the axial channel 21b and goes to fill the compartment 63, and then, through the lateral holes 64, it goes to occupy the compartment 65, thus reaching the upper part 20a of the infusion chamber 20.

To be more exact, from the compartment 65 the hot water is distributed through a filter 24a into the whole upper part 20a, reaching and infiltrating into the pre-packed portion 11 to form coffee as will be described hereafter.

When the coffee has been delivered, the water in the channel 38 is automatically discharged by means of an appropriate valve, not shown here, causing the hydraulic thrust to stop and hence the block 22 and the bushing 19 to ascend to the raised position thanks to the repositioning of the spring 54.

The lower part 20b of the infusion chamber 20, which defines the positioning seating of the pre-packed portions 11, is made on a trolley 23 able to slide horizontally from a first inner position to a second outer position.

In the first inner position, the lower part 20b is arranged in axis below the upper part 20a so that the cycle to prepare and deliver the coffee can be carried out, whereas in the second outer position the lower part 20b is removed from the structure of the machine 10 in order to facilitate and carry out the operations to position/remove the pre-packed portions 11.

Both the upper part 20a and the lower part 20b are associated with elastic means able to thrust against the pre-packed portion 11 when the infusion chamber 20 is open.

The elastic means consist, for the upper part 20a, of an axial pin 21c and of a spring 52 while for the lower part 20b they consist of an axial pin 61 and of a spring 53.

Their function is to maintain the pre-packed portion 11 in a slightly raised and intermediate position with respect to the relative parts 20a and 20b when they are distanced from each other, preventing the portion 11 from staying attached to the walls and therefore facilitating the subsequent operations to remove and discharge the portion 11 once the cycle to prepare the coffee has finished.

The trolley 23 is able to slide on a lower guide 25 made on the structure 35, and it is moved, in this case, by means of a pair of toothed wheels 26 engaged on respective racks 28 arranged at the sides of the trolley 23.

The toothed wheels 26 are mounted on a shaft 27 supported by uprights 30 of the structure 35 and connected to a reversible motor (not shown here).

When the reversible motor is activated, the toothed wheels 26 are made to rotate in one direction or the other and, acting on the respective racks 28, move the trolley 23 backwards or forwards.

There is a delivery channel 33 in the form of a hopper on the lower guide 25, from which the espresso coffee is collected by means of the appropriate receptacles (glasses or cups).

The delivery channel 33 communicates with the lower part 20*b* of the infusion chamber 20 through a collection channel 66 which the coffee reaches through a compartment 67 arranged below and communicating with the lower part 20*b* of the infusion chamber 20 (FIG. 2).

Between the two racks 28, the trolley 23 has a discharge aperture 31 of a width such as to allow the passage of at least one pre-packed portion 11.

When the trolley 23 is in the inner position, the discharge aperture 31 is made to co-operate with a refuse container (not shown here) inside which the pre-packed portions 11 are collected when they have been used.

The discharge aperture 23 is connected to the lower part 20*b* by means of a drainage channel 32 (FIG. 2) which allows any residual espresso coffee or water in the infusion chamber 20 to be discharged.

At the sides of the lower part 20*b*, the trolley 23 also comprises two longitudinal ridged profiles 48 of a height mating with the part of the pre-packed portion 11 which protrudes above the trolley 23.

According to the invention, the infusion chamber 20 can assume a first configuration (FIGS. 1 and 2) wherein it is able to accommodate pre-packed portions 11 of the wafer type 12 and a second configuration (FIGS. 3*a*–3*c*) wherein it is able to accommodate pre-packed portions 11 of the capsule type 13.

In the first configuration, the upper part 20*a* is associated to the filter 24*a* which can be removed and is able to be thrust elastically downwards, when the entire block is lowered during the coffee-preparation cycle, thanks to the elastic action of the pin 21*c* and the compression of the spring means 52.

The lower part 20*b* is made on a first trolley 123 and is associated with a relative filter 24*b*, removable and able to be thrust upwards in a co-ordinated manner by the pin 61 thanks to the compression of the spring 53.

As we have already said, when the coffee has been delivered and the block 22 is raised, the extension of the spring means 52 and 53 thrusts respectively downwards and upwards the relative filters 24*a* and 24*b* to facilitate the detachment and removal of the portion 11.

On the contrary, in the second configuration of the infusion chamber 20, the upper part 20*a* is associated with a seal 49 able to co-operate with the capsule 13 and constrained to the block 22 by means of an appropriate support 50; the lower part 20*b* is made on a second trolley 223 substantially structured like the first 123, but able to support a capsule 13.

In this case, since the height of the capsule 13 entails problems of stability and centering during the execution of the coffee-preparation cycle, two little elastic jaws 68 are mounted on the trolley 223 (FIGS. 3*b* and 3*c*), oscillating on respective pins 69 arranged aligned and outside the capsule 13, able to co-operate with two respective fixed abutments 70, in this case consisting of wheels.

When the trolley 223 is taken inside the machine 10 so that the coffee-preparation cycle can begin (FIG. 3*b*), the wheels 70 act on the respective jaws 68, taking them to the closed position in which substantially they grip the capsule 13 and hold it in position for the duration of the whole cycle.

When the cycle is finished and the trolley 223 is removed from the machine 10, the interference between the wheels 70 and the jaws 68 ceases, and the latter are returned to the open position (FIG. 3*c*), thus allowing the capsule 13 to be removed and discharged.

Returning now to the general description of the trolley 23, in correspondence with both its sides, and in front of the movable block 22, it has two vertical shoulders 34 on each of which there is a roller 29 able to improve the sliding of the trolley 23.

The shoulders 34 also support an expulsion organ 36 able to remove the pre-packed portion 11 from the lower part 20*b* of the infusion chamber 20 when used.

The expulsion organ 36 comprises a rotary bar 41 on which two washer elements 47 are mounted (of which only one is visible in FIG. 2) free to rotate with respect to the rotary bar 41 and each supporting a rear fin 42.

The two washer elements 47 support a lower fin 43 which extends transversely for a substantial part of the width of the infusion chamber 20.

The washer elements 47, and hence the fins 42 and 43, are elastically constrained to the rotary bar 41 by means of spring means which are not shown here, so that under normal conditions, that is to say, in stress-free conditions, the rear fin 42 is maintained in abutment on a transverse end-of-travel rod 45 supported by the vertical shoulders 34.

In an intermediate position between the washer elements 47 and the vertical shoulders 34 there are two cams 46 keyed onto the rotary bar 41, each able to co-operate with a relative longitudinal profile 48.

The two cams 46 support a transverse plate 44 arranged at the front of the lower fin 43 in a position substantially adjacent thereto.

With reference to FIGS. 4*a*–4*g*, we shall now describe the steps to insert and remove a pre-packed portion 11, in this case a wafer 12, into/from the infusion chamber 20 of the machine 10.

The trolley 23 is first of all taken to its outer position (FIG. 4*a*) to allow a wafer 12 to be easily deposited in correspondence with the lower part 20*b*; inside the lower part 20*b* the wafer 12 is held partly raised due to the thrust exerted by the elastic lifting means 61, 53 on the filter 24*b* arranged on the bottom.

Subsequently (FIG. 4*b*), the trolley 23 is moved to be taken to its inner position.

In this step, the movement of the trolley 23 takes the longitudinal profiles 48 into correspondence with the cams 46 which, sliding above the profiles 48, cause the rotary bar 41 to rotate clockwise.

Consequently, the transverse plate 44 exerts a thrust on the lower fin 43 which causes the washer element 47 to rotate in a clockwise direction too, allowing the wafer 12 to pass.

At the same time, the wafer 12, as it advances, comes into contact with the transverse plate 44, further thrusting it and simultaneously receiving therefrom a downwards thrust which causes it to settle and center better inside the lower part 20b.

Once the trolley 23 has assumed its inner position (FIG. 4c), the washer element 47 assumes again its normal position due to the effect of its own elastic means, while the wafer 12 is positioned below the block 22 and again raised.

By acting on the appropriate commands, the coffee-preparation cycle is thus started and the block 22 is taken to its lowered position (FIG. 4d) compressing the wafer 12 inside the infusion chamber 20.

At the end of this cycle, the block 22 returns to its raised position and, should more coffee have to be prepared, the trolley 23 is returned to its outer position.

While the trolley 23 is moving, the longitudinal profiles 48 return in correspondence with the cams 46 which, sliding on the profiles 48, cause the rotary bar 41 to rotate in an anti-clockwise direction (FIG. 4e).

The wafer 12, having returned to its raised position after the infusion chamber 20 has opened, is instead retained by the lower fin 43 of the expulsion organ 36 which, although thrust by the wafer 12 itself, is unable to rotate because of the abutment of the rear fin 42 on the end-of-travel rod 45.

When the trolley 23 reaches its outer position (FIG. 4f), the wafer 12, unable to follow the movement of the latter, falls into the discharge aperture 31, and rests on the guide 25 beneath.

The lower part 20b is therefore free and a new wafer 112 can be placed thereon for more coffee to be prepared.

The trolley 23 is therefore returned to the inner position, as it advances pushing the used wafer 12 out of the guide 25 and making it fall inside a collection container underneath (FIG. 4g).

It is obvious, however, that modifications and additions may be made to the invention, yet these shall remain within the field and scope thereof.

For example the system to move the trolley 23 may be of a different type, and may also include manual activation means, or the trolley 23 may have positioning seatings for two or more pre-packed portions 11.

What is claimed is:

1. Machine (10) to produce espresso coffee comprising a containing structure defining at least an infusion chamber (20) co-operating with means (14) to deliver water under pressure and means (15) to instantaneously heat the water, said infusion chamber (20) being able to contain a pre-packed portion (11) of coffee powder and comprising two parts, respectively upper (20a) and lower (20b), said two parts (20a, 20b) being able to be selectively coupled so as to define at least a first open condition of the infusion chamber, for the insertion/removal of the pre-packed portion (11), and a second closed condition of said infusion chamber (20) during the coffee-preparation cycle, said lower part (20b) defining a positioning seating for at least one pre-packed portion (11) and being made on a trolley (23) movable on a substantially horizontal plane from a first inner position, wherein the lower part (20b) is arranged in axis with and below the upper part (20a), to a second outer position wherein said lower part (20b) is removed outside 20 the structure of the machine (10) to allow said pre-packed portion (11) to be positioned, characterised in that the upper part (20a) of said infusion chamber (20) is made on a block (22) movable on a substantially vertical axis from a first raised position to a second lowered position wherein it is hermetically coupled with the lower part (20b), in that comprises expulsion means (36) able to automatically remove the portion (11), after the coffee has been delivered, during the withdrawal movement of said lower part (20b) from the structure (35) and inherently and consistently with this withdrawal movement, and in that at least said lower part (20b) co-operates with elastic means (61, 53) able to hold the pre-packed portion (11) at least partly detached from the bottom at least during said withdrawal movement to facilitate the discharge of said portion (11) after the coffee has been prepared.

2. Machine as in claim 1, characterised in that said trolley (23) is able to slide on a guide (25) on the lower part of which there is a channel (33) to deliver the espresso coffee.

3. Machine as in claim 1, characterised in that said trolley (23) is able to co-operate with motorised movement means.

4. Machine as in claim 3, characterised in that said motorised movement means comprise at least a toothed wheel (26) associated with a reversible motor and co-operating with a mating rack (28) made on the trolley (23).

5. Machine as in claim 1, characterised in that said trolley (23) is able to be moved manually.

6. Machine as in claim 1, characterised in that said trolley (23) comprises a discharge aperture (31) arranged at the rear of the lower part (20b) and suitable to allow the used pre-packed portions (11) to fall.

7. Machine as in claim 6, characterised in that said discharge aperture (31) is positioned above the guide (25) in the outer position of the trolley (23).

8. Machine as in claim 6 or 7, characterised in that said trolley (23) comprises a drainage channel (32) connecting said lower part (20b) with said discharge aperture (31) and able to discharge any coffee possibly remaining in the infusion chamber (20).

9. Machine as in claim 1, characterised in that said upper part (20a) co-operates with elastic means (21c, 52) able to hold the pre-packed portion (11) at least partly detached from said upper part (20a) in the open condition of the infusion chamber (20) to facilitate the discharge of said portion (11) after the coffee has been prepared.

10. Machine as in claim 1, characterised in that said expulsion means (36) comprise retention means able to retain the pre-packed portion (11) while the trolley (23) is moved from the inner position to the outer position.

11. Machine as in claim 10, characterised in that said retention means comprise a substantially vertical oscillating fin (43), arranged at the front with respect to the block (22) and transverse with respect to the direction of movement of the trolley (23), said fin (43) being able to be inclined only towards the block (22) to allow the pre-packed portion (11) to pass during the movement of the trolley (23) from the outer position to the inner position.

12. Machine as in claim 11, characterised in that said fin (43) co-operates with thrust means (44) able to take it to its position inclining towards the block (22), said thrust means (44) being associated with cam means (46) co-operating with longitudinal profiles (48) included on the trolley (23).

13. Machine as in claim 12, characterised in that said thrust means (44) are able to exert a settling and centering thrust on the pre-packed portion (11) during the movement of the trolley (23) from the outer position to the inner position.

14. Machine as in claim 1, characterised in that it comprises means to automatically move the block (22), on a substantially vertical axis, towards the hermetically sealed position of the infusion chamber (20), in co-ordination with the execution of the cycle to prepare the espresso coffee.

15. Machine as in claim 14, characterised in that said block (22) is able to be moved downwards, against the action of elastic means (54), by the hydraulic action generated by the pressure of the water circulating in the delivery means (14).

16. Machine as in claim 15, characterised in that it comprises a stationary positioning block (37) defining inside itself a conduit (38) for the circulation of pressurised water, said conduit (38) including the inlet (38a) connected to the delivery means (14) and able to receive the pressurised water circulating in said means (14), and the outlet (38b) facing towards an upper surface (22a) of said block (22) so that said pressurised water, during the cycle to prepare the coffee, is able to thrust said block (22) downwards to cause the hermetic sealing of the infusion chamber (20).

17. Machine as in claim 1, characterised in that the infusion chamber (20) is able to assume at least a first configuration, for the use of pre-packed portions (11) consisting of wafers (12) of pressed coffee powder wrapped in paper, and a second configuration for the use of pre-packed portions (11) consisting of capsules (13) containing coffee powder.

18. Machine as in claim 17, characterised in that in the configuration for capsules (13), closing jaws (68) are mounted on the trolley (223) co-operating with fixed abutments (70) able to assume a first, temporary position to clamp the capsule co-operating with the inner position of the trolley (223) and a second temporary position to release the capsule co-operating with the outer position of the trolley (223).

19. Machine as in claim 1, characterised in that said heating means (15) comprise electric resistance means (16) associated with plates (17a, 17b) between which a coil (18) is made for the water to pass.

20. Machine as in claim 19, characterised in that said coil (18) is connected to a steam production assembly (51) including at least a delivery nozzle (56).

21. Machine as in claim 20, characterised in that said steam production assembly (51) comprises delivery means (58) associated with elastic contrasting means (71) able to put said coil (18) selectively into communication with said delivery nozzle (56).

22. Machine as in claim 21, characterised in that it comprises thermostat means able to condition the temperature of activation of said electric resistance means (16) according to the selective production of hot water or steam.

23. Machine as in any claim from 20 to 22 inclusive, characterised in that it provides means to send water inside the coil (18) in pulses, said water to be transformed into steam in order to restore the quantity of steam delivered through said nozzle (56).

* * * * *